(12) United States Patent
Sandstrom et al.

(10) Patent No.: US 7,891,391 B2
(45) Date of Patent: Feb. 22, 2011

(54) TIRE WITH TREAD HAVING AN OUTER CAP LAYER AND UNDERLYING TRANSITION LAYER CONTAINING AT LEAST ONE OF DEPOLYMERIZED RUBBER, PRE-CURED RUBBER AND COAL DUST

(75) Inventors: Paul Harry Sandstrom, Cuyahoga Falls, OH (US); Kuo-Chih Hua, Richfield, OH (US); Marc Weydert, Strassen (LU); Joseph Kevin Hubbell, Akron, OH (US); Ping Zhang, Hudson, OH (US); Douglas Andrew Till, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 860 days.

(21) Appl. No.: 11/517,630

(22) Filed: Sep. 8, 2006

(65) Prior Publication Data

US 2008/0066839 A1    Mar. 20, 2008

(51) Int. Cl.
*B60C 1/00* (2006.01)
*B60C 11/00* (2006.01)
(52) U.S. Cl. ............. 152/209.4; 152/209.5; 152/209.18
(58) Field of Classification Search ............... 152/209.4, 152/209.5, 211, 209.18
See application file for complete search history.

(56) References Cited

U.S. PATENT DOCUMENTS

| | | | | |
|---|---|---|---|---|
| 5,356,939 | A   | 10/1994 | Burrowes et al. | 521/41.5 |
| 6,095,217 | A   | 8/2000 | Nakamura et al. | 152/209.5 |
| 6,265,454 | B1* | 7/2001 | McNutt et al. | 521/41 |
| 6,336,486 | B1  | 1/2002 | Iwasaki et al. | 152/209.4 |
| 6,420,457 | B1* | 7/2002 | Wicks et al. | 524/492 |
| 6,426,378 | B1* | 7/2002 | Lickes et al. | 524/262 |
| 6,561,244 | B2* | 5/2003 | Zanzig et al. | 152/209.5 |
| 6,959,743 | B2  | 11/2005 | Sandstrom | 152/209.5 |
| 2008/0066840 | A1* | 3/2008 | Sandstrom et al. | 152/209.5 |

FOREIGN PATENT DOCUMENTS

| | | | |
|---|---|---|---|
| EP | 224184 | * | 6/1987 |
| EP | 931809 A2 | | 7/1999 |

(Continued)

OTHER PUBLICATIONS

Machine Translation for Japan 2005-263104 (Oct. 26, 2009).*

(Continued)

*Primary Examiner*—Steven D Maki
(74) *Attorney, Agent, or Firm*—Henry C. Young, Jr.

(57) ABSTRACT

The invention relates to a tire having a lug and groove configured rubber tread having an outer rubber cap layer with a running surface and an underlying specialized transition rubber layer. The transition rubber layer is specialized in a sense of containing at least one of partially depolymerized rubber, particulate pre-cured rubber and coal dust. The outer tread cap layer is comprised of ground-contacting tread lugs with the tread running surface and associated tread grooves positioned between said tread lugs. The tread grooves may extend radially inward through the outer tread cap layer and, optionally, into the transition tread layer. The rubber tread configuration may also optionally also include a tread base rubber layer underlying the transition rubber layer.

1 Claim, 2 Drawing Sheets

FOREIGN PATENT DOCUMENTS

Figure 1:
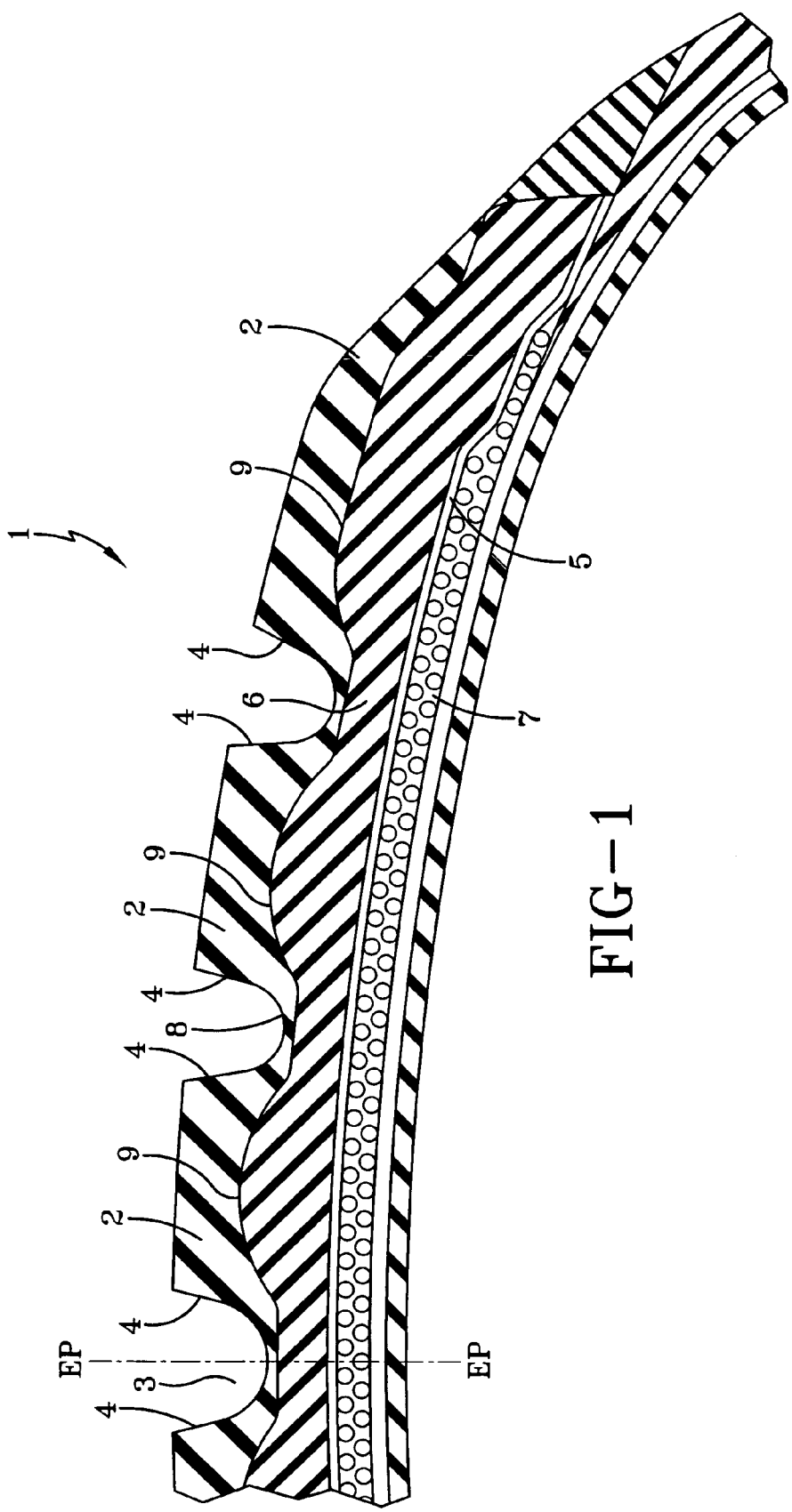

| | | |
|---|---|---|
| EP | 1270661 A2 | 1/2003 |
| EP | 1331107 A1 | 7/2003 |
| EP | 1398182 A2 | 3/2004 |
| EP | 1457308 A1 | 9/2004 |
| JP | 11-060810 * | 3/1999 |
| JP | 2005-263104 * | 9/2005 |
| JP | 2006-160932 * | 6/2006 |

OTHER PUBLICATIONS

European Search Report completed, Jan. 24, 2008.

* cited by examiner

TIRE WITH TREAD HAVING AN OUTER CAP LAYER AND UNDERLYING TRANSITION LAYER CONTAINING AT LEAST ONE OF DEPOLYMERIZED RUBBER, PRE-CURED RUBBER AND COAL DUST

FIELD OF THE INVENTION

The invention relates to a tire having a lug and groove configured rubber tread having an outer rubber cap layer with a running surface and an underlying specialized transition rubber layer. The transition rubber layer is specialized in a sense of containing at least one of partially depolymerized rubber, particulate pre-cured rubber and coal dust. The outer tread cap layer is comprised of ground-contacting tread lugs with the tread running surface and associated tread grooves positioned between said tread lugs. The tread grooves may extend radially inward through the outer tread cap layer and, optionally, into the transition tread layer. The rubber tread configuration may also optionally also include a tread base rubber layer underlying the transition rubber layer.

BACKGROUND AND PRESENTATION OF THE INVENTION

Pneumatic rubber tires have treads which may be of a lug and groove configuration.

Such tires are often of a cap/base construction composed of a lugged outer tread cap rubber layer with its lugs presenting a tread running surface intended to be ground-contacting with good physical properties to promote resistance to treadwear and reduced rolling resistance for the tire itself in combination with an underlying base rubber layer to provide a cushion for the outer tread cap rubber layer.

The tread cap rubber layer is typically prepared with a relatively expensive combination of elastomers and compounding ingredients intended to promote a tire running surface with suitable resistance to tread wear and reduced rolling resistance.

During service, the lugs of the tread cap rubber layer gradually wear away until the tread cap layer of the worn tire becomes sufficiently thin that the tire should be taken out of service. At such time, a considerable amount of the relatively expensive rubber tread cap layer normally remains which is either discarded with the tire or ground away to prepare the tire for retreading.

Accordingly, motivation is present for preparing a novel cost-savings tire tread which is a departure from past practice.

For this invention, it is proposed to provide a significantly less expensive specialized transition rubber layer in a sense of containing scrap rubber and/or coal dust, where said scrap rubber is comprised of at least one of partially depolymerized cured rubber and particulate pre-cured rubber, which underlies, said tread cap layer and is therefore exclusive of said outer tread cap rubber layer and exclusive of said base rubber layer, if used.

In practice, the outer tread rubber cap layer is typically of a rubber composition containing reinforcing filler comprised of rubber reinforcing carbon black, precipitated silica or a combination of rubber reinforcing carbon black and precipitated silica. A major function of the tread cap layer is typically to promote a reduction in rolling resistance, promote traction for the tire tread as well as to promote resistance to tread wear.

The optional tread base rubber layer is typically composed of a softer and cooler running rubber composition, as compared to the rubber composition of the outer tread cap layer to, in one sense, provide a cushion for the outer tread cap layer.

For this invention, the specialized transition rubber layer is presented as a significant departure from said outer tread cap rubber layer, and said optional tread base rubber layer if used, in a sense that it contains at least one of scrap rubber and coal dust. In one embodiment, the tread cap rubber layer itself, and the optional tread base rubber layer if used, do not contain any appreciable amount of, and are preferably exclusive of, said scrap rubber and coal dust. In another embodiment, said tread cap layer rubber and/or optional tread base layer rubber may contain said scrap rubber and/or coal dust ingredients in a limited amount.

In this manner, then, the specialized transition tread rubber layer is considered herein to be neither of such tread cap rubber layer nor such optional tread base rubber layer because, in part, it contains a significant content of such less expensive rubber composition in a sense of containing lower grade ingredients as compared to the rubber compositions of said tread cap rubber layer and said optional tread base rubber layer.

In practice, as the tread cap rubber layer, and its associated tread lugs with their running surfaces, wears away during the running of the tire over time during the service of the tire, the underlying specialized transition rubber layer, which extends radially outwardly into a portion of the lugs, and optionally into the grooves, of the outer tread cap layer, becomes exposed and thereby becomes a new portion of the running surface of the tread prior to the tread being sufficiently worn to warrant removing the tire from service. In this manner, then, the scrap rubber and/or coal dust-containing underlying specialized transition rubber layer may present a new running surface for the tread after a sufficient amount of the outer tread cap rubber layer wears away. The lug and groove configuration of the worn tread is therefore substantially maintained, since the underlying specialized transition layer extends radially outward to include a portion of the tread lugs, and optionally the tread grooves of the tread cap layer, and rubber composition of the transition rubber layer presents a new running surface for the tread lugs.

In one embodiment then, such tire is provided wherein at a least a portion of said transition rubber layer is positioned within at least one of said tread lugs of said outer tread cap rubber layer in a manner to become a running surface of the tire upon at least a portion of said lug of said outer tread cap layer wearing away (e.g. as the tire is run in service) to expose said transition rubber layer.

Heretofore, various dual layered tire treads have been proposed which are composed of a cap/base construction in which the outer tread cap rubber layer contains a running surface for the tire and the underlying tread base rubber layer provides, in a sense, a cushion for the tread cap layer, such as for example U.S. Pat. No. 6,959,743 or of a dual tread base layer configuration, such as for example U.S. Pat. No. 6,095,217 as well as a cap/base construction in which the base layer extends into lugs of the tread and into its tread cap layer such as for example U.S. Pat. No. 6,336,486.

The tire tread of this invention differs significantly therefrom in that its transition rubber layer is intended to be exclusive of the tread cap rubber layer and the tread base rubber layer, if used, for example, in a sense that it contains at least one of partially depolymerized cured rubber, particulate pre-cured rubber and coal dust, and particularly by containing at least one of said depolymerized cured rubber and particulate pre-cured rubber.

In practice, scrap rubber in a form of partially depolymerized cured rubber (sometimes referred to as being recycle rubber) and in a form of particulate pre-cured rubber are well known to those having skill in such art.

Such recycle rubber is a vulcanized (cured) rubber which has been broken down by various processes, or combination of processes, which may include chemical breakdown, to form a partially depolymerized, and possibly partially devulcanized, rubber. Representative of such recycle rubber is, for example, partially depolymerized rubber as RNR 50B11™ from Rubber Resources.

Such particulate pre-cured rubber (sometimes referred to as ground cured rubber) may be obtained, for example, by physically grinding vulcanized rubber, which may include cryogenic grinding, to form small particles of cured rubber. Representative of such ground pre-cured rubber is, for example, TR-30™ from Edge Rubber.

It is important to appreciate that both the recycle rubber and the ground rubber relate to rubber which has been first vulcanized.

The resultant recycle rubber and ground rubber may have somewhat an appearance of unvulcanized rubber but have important differences and properties therefrom. They, particularly the recycle rubber, are composed of a mixture of polymer units of various and numerous constructions different from either unvulcanized or vulcanized rubber. Thus they are typically a complex mixture of largely unknown polymer(s), compounding ingredients, which may possibly contain small amounts of bits of textile fiber and the like.

In practice, it has been observed that, after adding sulfur and vulcanization accelerator curatives to recycle rubber and to ground cured rubber, followed by sulfur re-vulcanization thereof, the resulting physical properties, such as for example tensile, elongation and dynamic modulus, are usually somewhat lower than the corresponding properties of the original vulcanized rubber composition prior to its being partially depolymerized or ground into fine vulcanized rubber particles and resistance to abrasion is usually expected to be reduced more than most other physical properties of the cured rubber composition.

Coal dust is a carbonaceous dust from naturally occurring coal which significantly differs from synthetically produced rubber reinforcing carbon black composed of aggregates of primary carbon particles as would be well known to those having skill in such art. Coal dust might sometimes be referred to as coal fines. Coal dust is conventionally of significantly greater size (greater average diameter) than rubber reinforcing carbon black aggregates, is not rubber reinforcing in the sense of rubber reinforcing carbon black, represents a significantly lower cost filler than rubber reinforcing carbon black and, significantly, can be usually be used in greater quantities (concentration) in the rubber composition without significantly adversely affecting the processing of the rubber composition. Representative of such coal dust is, for example, Austin Black 325™ from Coal Fillers.

In the description of this invention, the terms "rubber" and "elastomer" where used herein, are used interchangeably, unless otherwise prescribed. The terms "rubber composition", "compounded rubber" and "rubber compound", where used herein, are used interchangeably to refer to "rubber which has been blended or mixed with various ingredients" and the term "compound" relates to a "rubber composition" unless otherwise indicated. Such terms are well known to those having skill in the rubber mixing or rubber compounding art.

In the description of this invention, the term "phr" refers to parts of a respective material per 100 parts by weight of rubber, or elastomer, where such rubber is intended herein to not include said partially depolymerized pre-cured rubber and said particulate pre-cured rubber which are, instead, to be considered to herein as additives in a sense of being compounding ingredients for the rubber composition. The terms "cure" and "vulcanize" are used interchangeably unless otherwise indicated. The term "Tg", if used, means the middle point glass transition temperature of an elastomer determined by DSC (differential scanning calorimeter) at a heating rate of 10° C. per minute as would be understood by those having skill in such art.

SUMMARY AND PRACTICE OF THE INVENTION

In accordance with this invention, a tire is provided having a rubber tread comprised of an outer tread cap layer and an underlying specialized transition tread rubber layer (positioned radially inward of and underlying said outer tread cap layer);

wherein said outer tread cap rubber layer is comprised of a lug and groove configuration with raised lugs having tread running surfaces (said running surfaces intended to be ground-contacting) and grooves positioned between said lugs; and wherein said specialized transition rubber layer contains at least one ingredient comprised of at least one of scrap rubber and coal dust wherein said scrap rubber is comprised of at least one of at least partially depolymerized cured rubber and particulate pre-cured rubber.

In one embodiment, said tread specialized transition layer rubber is comprised of, based upon parts by weight per 100 parts by weight rubber (phr):

(A) 100 phr of at least one diene-based elastomer;
(B) from about 5 to about 50 phr of at least one ingredient comprised of at lease one of:
  (1) partially depolymerized pre-cured rubber,
  (2) particulate pre-cured rubber, and
  (3) coal dust.

In one embodiment, said specialized transition layer rubber contains about 40 to about 120 phr of filler reinforcement selected from at least one of rubber reinforcing carbon black and precipitated silica comprised of:

(A) rubber reinforcing carbon black;
(B) precipitated silica (amorphous, synthetic silica); or
(C) a combination of rubber reinforcing carbon black and precipitated silica (synthetic amorphous silica), (e.g. from about 5 to about 80 phr of rubber reinforcing carbon black and from about 5 to about 80 phr of precipitated silica).

In one embodiment, at least one of said tread cap layer rubber and said optional tread base layer rubber, if used, contains up to 20, alternately up to 10, phr of at least one of said ingredients comprised of at least one of:

(A) partially depolymerized pre-cured rubber,
(B) particulate pre-cured rubber, and
(C) coal dust;

so long as said tread cap layer rubber and said tread base rubber individually contain up to 3 phr of, or up to 10 phr less than, which ever is the greatest amount, each of said ingredients contained in said tread transition rubber.

In one embodiment, said tread outer cap layer rubber may contain from about 40 to about 120 phr of filler reinforcement selected from at least one of carbon black and precipitated silica comprised of:

(A) rubber reinforcing carbon black;
(B) precipitated silica (amorphous, synthetic silica); or
(C) a combination of rubber reinforcing carbon black and precipitated silica (e.g. from about 20 to about 80 phr of rubber reinforcing carbon black and from about 5 to about 80 phr of precipitated silica).

In one embodiment, said transition tread rubber layer extends radially outward into and within at least one of said tread lugs to include from about 5 to about 50 percent, alternately from about 10 to about 30 percent, of the height of said tread lugs extending from the bottom of at least one tread groove adjacent to said tread lug, wherein said bottom of said tread groove is within said outer tread cap rubber layer.

In another embodiment, at least one of said tread grooves extends radially inwardly through said outer tread cap layer into a portion of (preferably therefore not entirely through) said transition tread rubber layer and said groove is thereby a part of said transition tread rubber layer.

A significant aspect of this invention is providing the inclusion of the transition tread rubber layer in the tire tread configuration which contains at least one of said scrap rubber and coal dust in a sense of:

(A) promoting a reduced cost of the overall tread;

(B) requiring the grooves of the tread to extend through the outer tread cap rubber layer radially inward into the transition rubber layer in a manner for the transition rubber layer to provide a running surface of the tread upon the wearing away of the outer tread cap rubber layer during the service running of the tire, and (C) providing the transition rubber layer with physical properties (such as for example, stiffness, hysteresis and rebound physical properties) similar to physical properties of the tread outer rubber cap layer with an expected degree of reduction in abrasion resistance (due to the inclusion of said scrap rubber and/or coal dust in the transition rubber layer and therefore a potential reduction in tread wear as the transition rubber becomes exposed) for said eventual running surface presented by said transition rubber layer as the outer tread cap rubber layer wears away and exposes the underlying, grooved, transition rubber layer with during the running service of the tire.

Indeed, the aspect of providing a tread cap lug which abridges two associated tread cap grooves of which the bottom portion extends radially inward into said transition rubber layer is considered herein to be significant because it provides a grooved underlying transition rubber layer which maximizes the use of the scrap rubber and/or coal dust-containing transition rubber layer to promote a reduction in cost of the overall tread without significantly affecting various aforesaid physical properties of the running surface of the tire during most of the service life of the tire tread.

In practice, the above significant aspects of the invention are to be considered in a synergistic combination rather than treated as individual aspects and components of the invention. The tire tread particularly should not be considered as a simple tread composite of a relatively thick base and thin cap but of a combination of a tread cap rubber layer and underlying transition rubber layer with its inclusion of said scrap rubber and/or coal dust together with a tread configuration which requires grooves to extend through the outer tread cap rubber layer radially inward and optionally into portion of the transition rubber layer.

The combination of the grooved tread cap rubber layer and associated grooved underlying transition rubber layer is considered herein to be synergistic in a sense that, as the outer tread cap layer wears away during the service of the tire, the underlying transition rubber layer presents a lug and groove configuration for which the then exposed lugs of the transition rubber layer (which contains the aforesaid inclusion of said scrap rubber and/or coal dust) presents a portion of the running surface of the tire for which its rubber can present have physical properties similar to the rubber of aforesaid outer tread rubber cap layer other than expected resistance to abrasion resistance (e.g. an expected reduction in abrasion resistance and an expected reduction in associated resistance to tread wear for a tire with such tread).

The precipitated silica, if used in one or more of the tread rubber compositions, is normally used in combination with a coupling agent having a moiety reactive with hydroxyl groups contained on the surface of the silica (e.g. silanol groups) and another moiety interactive with said diene-based elastomers. For example, such coupling agent may be a bis (3-trialkoxysilylalkyl) polysulfide which contains an average of from 2 to 4, alternately an average of from 2 to about 2.6 or an average of from about 3.4 to about 3.8, connecting sulfur atoms in its polysulfidic bridge. Representative of such coupling agent is for example, bis(3-triethoxysilylpropyl) polysulfide.

Alternately, such coupling agent may be an organomercaptosilane (e.g. an alkoxyorganomercaptosilane), and particularly an alkoxyorganomercaptosilane having its mercapto function capped.

Such coupling agent may, for example, be added directly to the elastomer mixture or may be added as a composite of precipitated silica and such coupling agent formed by treating a precipitated silica therewith.

In practice, the synthetic amorphous silica may be selected from aggregates of precipitated silica, which is intended to include precipitated aluminosilicates as a co-precipitated silica and aluminum.

Such precipitated silica is, in general, well known to those having skill in such art. The precipitated silica aggregates may be prepared, for example, by an acidification of a soluble silicate, e.g., sodium silicate, in the presence of a suitable electrolyte and may include co-precipitated silica and a minor amount of aluminum.

Such silicas might have a BET surface area, as measured using nitrogen gas, such as, for example, in a range of about 40 to about 600, and more usually in a range of about 50 to about 300 square meters per gram. The BET method of measuring surface area is described in the *Journal of the American Chemical Society*, Volume 60 (1938).

The silica might also have a dibutylphthalate (DBP) absorption value in a range of, for example, about 50 to about 400 $cm^3/100$ g, alternately from about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from J. M. Huber Corporation as, for example, Zeopol 8745 and Zeopol 8715, silicas from Degussa AG with, for example, designations VN2, VN3 and Ultrasil 7005 as well as other grades of precipitated silica.

Various rubber reinforcing carbon blacks might be used for the tread rubber compositions. Representative of various rubber reinforcing blacks may be referred to by their ASTM designations such as for example, although not intended to be limiting, N110, N121 and N234. Other rubber reinforcing carbon blacks may found, for example, in *The Vanderbilt Rubber Handbook* (1978), Page 417.

Representative of various diene-based elastomers for said tread cap rubber, said tread transition rubber layer and said optional base layer may include, for example, styrene-butadiene copolymers (prepared, for example, by organic solvent solution polymerization or by aqueous emulsion polymerization), isoprene/butadiene copolymers, styrene/isoprene/butadiene terpolymers and tin coupled organic solution polymerization prepared styrene/butadiene copolymers, cis 1,4- polyisoprene and cis 1,4-polybutadiene as well as trans 1,4-polybutadiene 3,4-polyisoprene and high vinyl polybutadiene rubber.

Figure 2:
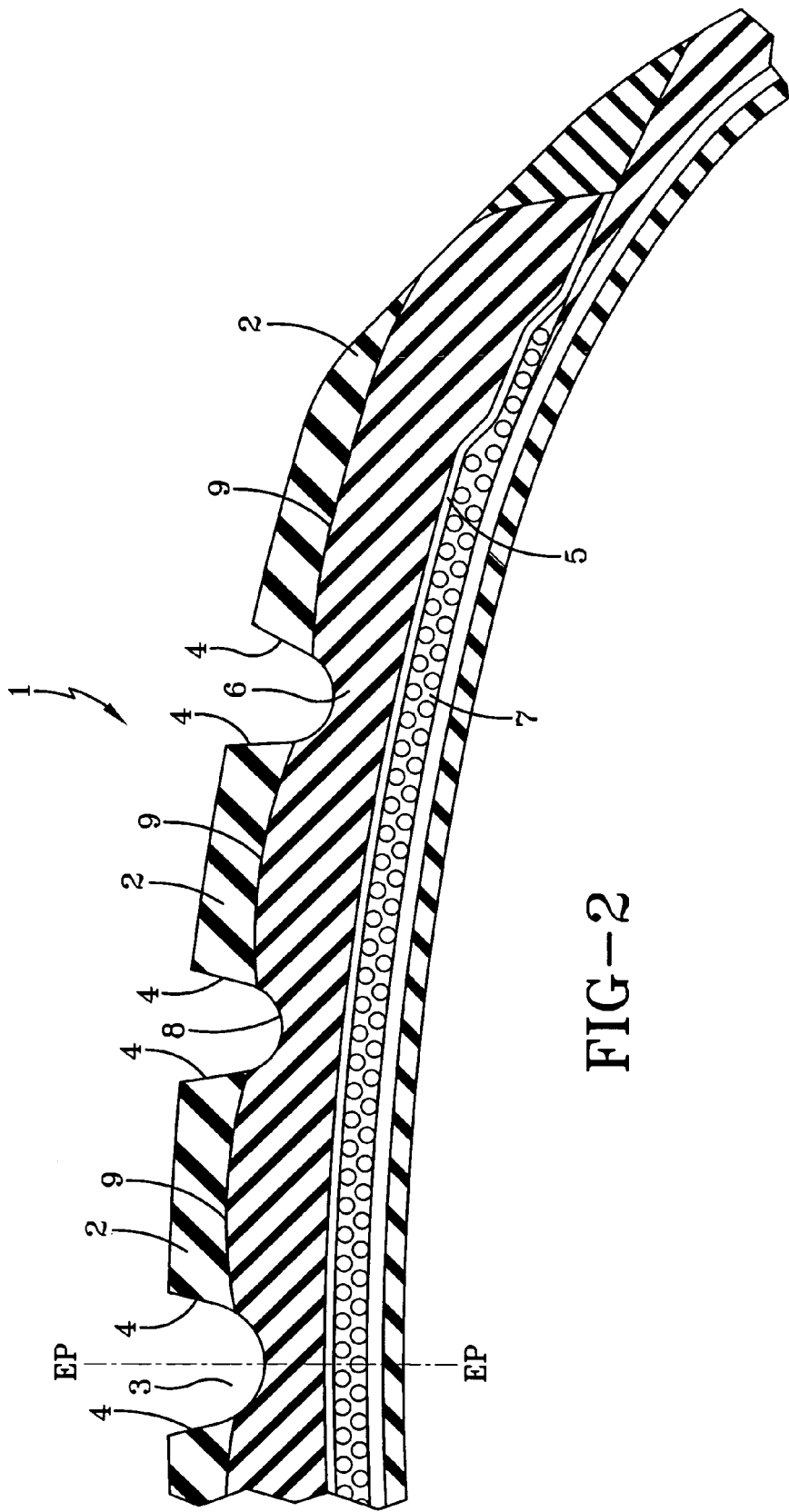

For a further understanding of this invention, FIG. 1 (FIG. 1) and FIG. 2 (FIG. 2) are provided as partial cross-sectional views of a tire tread.

In particular, FIG. 1 depicts a tread construction of a tread (1) a lug (2) and groove (3) construction which is comprised of a tread outer cap rubber layer (4) containing said grooves (3) and lugs (2) intended to be ground-contacting, an optional tread base rubber layer (5), if used, and a specialized transition tread rubber layer (6) underlying said tread outer cap layer (4) as well as circumferential belt plies (7), wherein said transition layer (6) is referred to herein as being specialized in a sense of containing a significant amount of scrap rubber and/or coal dust (where said scrap rubber is depolymerized pre-cured rubber and/or pre-cured rubber particles). It is considered herein that said scrap rubber and/or coal dust-containing specialized transition tread layer (6) constitutes a relatively lower cost rubber composition than the rubber composition of said tread cap rubber layer (4) and said optional tread base rubber layer (5).

From FIG. 1 it can be seen that a bottom portion (8) of the grooves (3) extends radially inward within said tread cap layer (4). It can further be seen that the underlying tread specialized transition layer (6) extends radially outward into the tread lugs (2) to a position (9), or extent, of up to about 50 percent of the height of the tread lugs (2) from the bottom of the associated tread grooves (8) on at least one side of the tread lugs (2).

In this manner it is seen that the tread specialized transition rubber layer (6) extends into the lug (2) to a position (9), or extent, in a manner to provide significant physical support to the associated tread lug (2) into which it radially extends.

From FIG. 2 it can be seen that the bottom portion (8) of the grooves (3) extends radially inward into the tread transition rubber layer (6) or, in other words, a portion of said transition layer (6) encompasses the bottom portion (8) of said grooves (3) of said tread cap layer (4) which extend completely through said tread cap layer (4) and into the tread transition rubber layer (6).

In particular, it is seen that the tread transition rubber layer (6) extends into the tread lug (2) to a position (9), or extent, in a manner to provide significant physical support to the associated lug (2) into which it radially extends.

In FIG. 2, the radial extension of the tread transition rubber layer (6) outward into the groove (3) is more inclusive of the portion of the wall (4) of the associated grooves (3).

In practice, the rubber compositions may be prepared in at least one preparatory (non-productive) mixing step in an internal rubber mixer, often a sequential series of at least two separate and individual preparatory internal rubber mixing steps, or stages, in which the diene-based elastomer is first mixed with the prescribed silica and/or carbon black as the case may be followed by a final mixing step (productive mixing step) in an internal rubber mixer where curatives (sulfur and sulfur vulcanization accelerators) are blended at a lower temperature and for a substantially shorter period of time.

It is conventionally required after each internal rubber mixing step that the rubber mixture is actually removed from the rubber mixer and cooled to a temperature below 40° C., perhaps to a temperature in a range of about 20° C. to about 40° C. and then added back to an internal rubber mixer for the next sequential mixing step, or stage.

Such non-productive mixing, followed by productive mixing is well known by those having skill in such art.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 170° C.) and elevated pressure in a suitable mold. Such practice is well known to those having skill in such art.

It is readily understood by those having skill in the pertinent art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Representative non-aromatic rubber processing oils, if used, namely such oils which contain less than 15 weight percent aromatic compounds, if at all, are, and for example, contain 46 percent to 51 percent paraffinic content and 36 percent to 42 percent naphthenic content.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least three stages, namely, at least two non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

EXAMPLE I

Rubber compositions were prepared for evaluating an effect of an inclusion in a rubber composition of scrap rubber or coal dust for a transition, intermediate layer for a tire tread.

Sample A is a Control rubber sample. Experimental rubber Samples B through G contained various amounts of scrap rubber or coal dust.

The scrap rubber was scrap rubber in the sense of partially depolymerized cured rubber or particulate (ground) pre-vulcanized rubber.

The rubber compositions were prepared by mixing the ingredients in sequential non-productive (NP) and productive (PR) mixing steps in one or more internal rubber mixers.

The basic recipe for the rubber Samples is presented in the following Table 1 and recited in parts by weight unless otherwise indicated.

TABLE 1

|  | Parts |
| --- | --- |
| Non-Productive Mixing Step (NP), (mixed to 160° C.) | |
| Styrene/butadiene rubber[1] | 100 (plus 37.5 parts oil) |
| Carbon black (N299)[2] | 70 |
| Processing oil and wax[3] | 6.8 |
| Zinc oxide | 2 |
| Stearic acid[4] | 2 |
| Antidegradant[5] | 2.3 |
| Scrap rubber or coal dust[6] | variable from 0 to 30 |
| Productive Mixing Step (PR), (mixed to 110° C.) | |
| Sulfur | 1.5 |
| Sulfenamide and thiuram disulfide types | 1.5 |

[1]emulsion polymerization prepared styrene/butadiene rubber as PLF1712™ from The Goodyear Tire & Rubber Company having a bound styrene content of about 23.5 percent
[2]Rubber reinforcing carbon black as N299, an ASTM designation
[3]Rubber processing oil and microcrystalline wax
[4]Fatty acid comprised (composed) of at least 90 weight percent stearic acid and a minor amount of other fatty acid comprised (composed of) primarily of palmitic and oleic acids.
[5]Antidegradant of the phenylene diamine type
[6]Recycle rubber as partially depolymerized cured rubber as RNR 50B11™ from Rubber Resources; reclaim rubber as ground cured rubber particles as TR-30™ from Edge Rubber; and coal dust as Austin Black 325™ from Coal Fillers.

The following Table 2 illustrates cure behavior and various physical properties of rubber compositions based-upon the basic recipe of Table 1.

TABLE 2

|  | Samples | | | | | | |
| --- | --- | --- | --- | --- | --- | --- | --- |
|  | Control A | B | C | D | E | F | G |
| Recycle, depolymerized cured rubber (phr) | 0 | 14 | 26 | 0 | 0 | 0 | 0 |
| Ground reclaim, pre-cured rubber (phr) | 0 | 0 | 0 | 15 | 30 | 0 | 0 |
| Coal dust (phr) | 0 | 0 | 0 | 0 | 0 | 15 | 30 |
| Rheometer[1], 150° C. | | | | | | | |
| Maximum torque (dNm) | 13.57 | 12.62 | 11.67 | 14.02 | 13.33 | 16.14 | 16.73 |
| Minimum torque (dNm) | 2.57 | 2.71 | 2.77 | 3.58 | 3.95 | 3.59 | 3.73 |
| Delta torque (dNm) | 11 | 9.91 | 8.9 | 10.44 | 9.38 | 12.55 | 13 |
| T90 (minutes) | 6.7 | 5.8 | 5.6 | 6.5 | 6.1 | 6.7 | 7 |
| Stress-strain, ATS, 32 min, 150° C.[2] | | | | | | | |
| Tensile strength (MPa) | 18.5 | 14.2 | 13.2 | 14.1 | 13.1 | 14.7 | 14.1 |
| Elongation at break (%) | 578 | 501 | 510 | 454 | 457 | 448 | 469 |
| 300% modulus (MPa) | 8.7 | 7.8 | 7 | 8.9 | 8.1 | 10 | 9.3 |
| Rebound | | | | | | | |
| 23° C. | 33 | 34 | 34 | 33 | 33 | 33 | 32 |
| 100° C. | 48 | 47 | 47 | 49 | 48 | 51 | 50 |
| Shore A Hardness | | | | | | | |
| 23° C. | 66 | 66 | 64 | 65 | 65 | 69 | 70 |
| 100° C. | 53 | 52 | 50 | 53 | 52 | 57 | 58 |

TABLE 2-continued

|  | Samples | | | | | | |
| --- | --- | --- | --- | --- | --- | --- | --- |
|  | Control A | B | C | D | E | F | G |
| RDS Strain sweep, RPA, 10 Hz, 30° C.[3] | | | | | | | |
| Modulus G', at 0.1% strain (kPa) | 1938 | 1811 | 1639 | 1953 | 1923 | 2454 | 2616 |
| Tan delta at 10% strain | 0.175 | 0.186 | 0.188 | 0.176 | 0.183 | 0.175 | 0.178 |
| Tear Strength[4] | | | | | | | |
| 95° C., (Newtons) | 128 | 136 | 135 | 117 | 111 | 102 | 77 |

[1]Data according to Rubber Process Analyzer as RPA 2000 ™ instrument by Alpha Technologies, formerly the Flexsys Company and formerly the Monsanto Company.
[2]Data according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[3]Data according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993.
[4]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.

It can be seen from Table 2 that the most of the overall cured physical properties for the lower cost rubber compounds Samples B through G (lower cost in the sense of containing said scrap rubber and/or coal dust) are comparable to the Control Sample A. However, it is expected that rubber Samples B through G would exhibit a reduced abrasion resistance property in a sense of providing increased DIN abrasion values (e.g. increased abrasion loss values).

EXAMPLE II

Rubber compositions were prepared and evaluated as in Example I for an effect of an inclusion in a rubber composition of scrap rubber and coal dust for a transition, intermediate layer for a tire tread, particularly including an evaluation of abrasion resistance of the cured rubber composition.

Sample H is a Control rubber sample. And Experimental rubber Sample I contained both scrap rubber and coal dust.

The scrap rubber was scrap rubber in the sense of partially depolymerized cured rubber and/or particulate (ground) pre-vulcanized rubber.

Various physical properties for the Samples are reported in the following Table 3.

TABLE 3

|  | Control H | Sample I |
| --- | --- | --- |
| Recycle, depolymerized cured rubber (phr) | 0 | 26 |
| Ground reclaim, pre-cured rubber (phr) | 0 | 9 |
| Coal dust (phr) | 0 | 9 |
| Rheometer[1], 150° C. | | |
| Maximum torque (dNm) | 12.2 | 12.6 |
| Minimum torque (dNm) | 3.1 | 3.5 |
| Delta torque (dNm) | 9.1 | 9.1 |
| T90 (minutes) | 5.7 | 5.8 |
| RDS Strain sweep, RPA, 10 Hz, 30° C.[3] | | |
| Modulus G', at 1% strain (kPa) | 1655 | 1651 |
| Tan delta at 10% strain | 0.254 | 0.223 |
| DIN Abrasion (2.5 N, cc rel loss)[5] | 86 | 123 |

[5]Data according to DIN 53516 abrasion resistance test procedure using a Zwick drum abrasion unit, model 6102 with 2.5 Newtons force. DIN standards are German test standards. The DIN abrasion results are reported as relative values to a control rubber composition used by the laboratory.

From Table 3 it can be seen that most of the reported physical properties for the lower cost rubber compound Sample I (lower cost in the sense of containing said scrap rubber and coal dust) are comparable to the Control Sample H.

However, cured rubber Sample I exhibited a significantly reduced abrasion resistance property in a sense of providing a significantly increased DIN abrasion value, namely a significantly increased abrasion loss value, as compared to the Control rubber Sample H.

While certain representative embodiments and details have been shown for the purpose of illustrating the subject invention, it will be apparent to those skilled in this art that various changes and modifications can be made therein without departing from the scope of the subject invention.

What is claimed is:

1. A tire having a rubber tread comprised of an outer tread cap layer and an underlying specialized transition tread rubber layer;
   wherein said tread contains a tread base rubber layer underlying said specialized transition rubber layer;
   wherein said outer tread cap rubber layer is comprised of a lug and groove configuration with raised lugs having tread running surfaces and grooves positioned between said lugs; and
   wherein said transition rubber layer contains particulate pre-cured rubber and coal dust,
   wherein said outer tread cap rubber layer and said tread base rubber layer are exclusive of particulate pre-cured rubber and coal dust,
   wherein at least one of said tread grooves extends radially inwardly through said outer tread cap layer into a portion of, and not entirely through, said transition tread rubber layer and said groove is thereby a part of said transition tread rubber layer;
   wherein said tread transition layer rubber is comprised of, based upon parts by weight per 100 parts by weight rubber (phr):
   (A) elastomer(s) consisting of 100 phr of at least one diene-based elastomer;
   (B) from about 5 to about 50 phr of combination of ingredients, comprised of a combination of particulate pre-cured rubber and coal dust, and wherein said tread transition layer rubber contains from about 40 to about 120 phr of filler reinforcement selected from rubber reinforcing carbon black, wherein said transition tread rubber layer extends radially outward into and within at least one of said tread lugs to include from about 5 to about 50 percent of the height of said tread lug extending from the bottom of at least one tread groove adjacent to at least one side of said tread lug, and wherein at a least a portion of said transition rubber layer is positioned within at least one of said tread lugs of said outer tread cap rubber layer in a manner to become a running surface of the tire upon at least a portion of said lug of said outer tread cap layer wearing away to expose said portion of said transition rubber layer.

\* \* \* \* \*